United States Patent [19]

Lambert

[11] 4,215,247
[45] Jul. 29, 1980

[54] DIGITAL CONFERENCING APPARATUS
[75] Inventor: Donald L. Lambert, Terrell, Tex.
[73] Assignee: Rockwell International Corporation, El Segundo, Calif.
[21] Appl. No.: 960,491
[22] Filed: Nov. 13, 1978
[51] Int. Cl.² ............................................. H04M 3/00
[52] U.S. Cl. ........................ 179/18 BC; 340/347 DD; 179/1 CN
[58] Field of Search ........... 340/347 DD; 179/18 BC, 179/1 CN

[56] References Cited
U.S. PATENT DOCUMENTS

| | | | |
|---|---|---|---|
| 3,743,790 | 7/1973 | Hilsley | 179/18 BC |
| 3,949,299 | 4/1976 | Song | 340/347 DD |
| 3,971,891 | 7/1976 | Wolcott | 340/347 DD |
| 4,128,832 | 12/1978 | Betts | 340/347 DD |

Primary Examiner—Charles D. Miller
Attorney, Agent, or Firm—Bruce C. Lutz; Howard R. Greenberg; H. Fredrick Hamann

[57] ABSTRACT

Apparatus is illustrated for converting nonlinear or compressed digital information representative of an analog signal from a plurality of sources into a single composite digital signal. As specifically used and illustrated, a plurality of digital voice signals are summed to produce a new digital nonlinear signal representative of a combination of original voice signals for transmittal to each of the conferees in a conference call. This is accomplished without reverting to analog signals during the combination process.

6 Claims, 8 Drawing Figures

DIGITAL CONFERENCING APPARATUS

THE INVENTION

The present invention is generally concerned with electronics and more specifically with apparatus for combining nonlinear digital signals. Even more specifically, it pertains to conferencing voice signals represented in a digital format where a compression has been provided in an adaptive continuously variable slope delta (CVSD) format.

The arrangement of connecting more than two voice channels together in a call is generally known as conferencing. The simplest type of conference call is the one in which a third person joins an existing conversation. The number of participants in a conference arrangement is usually very small with four to six participants constituting an average conference call. However, there are circuits which are designed to accommodate the occasional needs of hundreds of participants in a conference call. Also on occasion, there may exist a need to have a conference call where two or more widely separated groups of participants are involved.

In the ideal conferencing arrangement, any conferee can speak at anytime, and any number of conferees can speak simultaneously with all concerned being able to hear the combined voices of all conferees attempting to speak. Furthermore, in the ideal conferencing arrangement, the quality of the conference circuit should be such that a listener can recognize the speaker who breaks into the active speaker's conversation.

In analog conference circuits, input signals from all conferees, after passing through respective analog amplifiers, are summed. The output signal of the analog conference circuit is a composite of all input signals. Usually, because of the delays that may be involved, it is desirable to subtract from the composite signal the contribution of a single conferee before transmitting the composite signal to that conferee. However, in systems where delays are small, this requirement of subtracting the confree's contribution can be waived.

While the analog conference circuits have been designed for many years, all presently known attempts to duplicate the quality of the analog conferencing, using digital techniques, have been limited to the Pulse Code Modulated (PCM) format. Those using other formats have been forced to settle for a lower quality conference signal or have resorted to a conversion from the digital signal to the analog equivalent before the conferencing occurred. The resulting analog conference signal was then reconverted to digital before retransmission to the conferee. The reason for this difficulty is that direct summing of digital bit streams will not produce intelligible speech since the digital signals are based on a nonlinear compression algorithm. If compression of the voice signals was not performed, the conferencing could be implemented relatively simply through the use of a straightforward summing process. However, where compression is utilized, the only feasible approach is to reconvert the signals involved to linear signals either digitally or analog. The present approach appears to be the only commercially practical implementation for converting the nonlinear digital signals to linear digital signals of a form which may be directly combined to produce a linear conferenced digital signal.

In reaching the above conclusion, it may be noted that various types of prior art algorithms have been studied and discarded such as the instant speaker algorithm wherein the digital signals from all conferees are sampled and the one having the greatest amplitude is transmitted to all conferees. The other signals are blocked. This type of conference bridge inherently has the problem of loss of speech syllables either at the beginning or end of words with soft consonants. A secondary problem is the possibility that one of the conferees, if in an area where there is a loud, continuous background noise, may cause the conference circuit to select his line for transmission continuously.

A second prior art algorithm is the activity selection algorithm. The digital signals from all conferees in this arrangement are sampled, and the one having the greatest "slope" is transmitted to all conferees. The other are blocked again. This arrangement suffers from the same shortcomings as does the instant speaker algorithm. Another system is the digital-to-analog (D/A) and analog-to-digital (A/D) conversion approach. The digital signal from each conferee is converted to analog form and the analog signals are combined in a conventional analog conference circuit. The summed analog signals are then redigitized for transmission. This approach does provide the desirable features of an ideal conference but the D/A and A/D conversions degrade the information and require a great deal of circuitry.

Another way to handle conferencing in a digital form is the direct digital summation algorithm. In this system binary information from all participating channels is digitally summed into a composite signal representing the total response and transmitted to all the participants. However, each conferee's contribution to the composite signal is deleted as described above. For systems with nonlinear companding characteristics, an algebraic sum by simple binary addition is not possible. Such systems require nonlinear-to-linear code translation, binary addition, and then conversion back to a nonlinear code.

For systems employing delta modulation, a straight-forward application of the above idea further implies a delta modulation modem (modulator-demodulator) for each conferee's signal in addition to the code translation required for nonlinear companding. Such bidirectional modulation, demodulation and code translation for each participant is expensive to implement. While from a theoretical standpoint there should be no degradation of signal in this last approach, the fallacy is that in the conversion process the same approximations are made in the transformation as orginally made and thus the same degradation occurs. In the opinion of listeners who have heard the last described system and compared it with a D/A and A/D conversion system, neither one is apparently superior to the other.

The present invention employs all digital techniques but overcomes the shortcomings of the last described system. The present technique takes advantage of all the information available in CVSD modulated signals but performs to degrading conversions on them. Each of the conferee's signals which are digital and nonlinearly representative, are processed according to the appropriate expansion algorithm (the same one employed during the modulation process) to produce a digital sequence linearly representing the differentials of the voice signals. Each of these expanded signals is summed and added to an element of the conference sequence which was previously stored in memory. This gives a linear digital signal indicative of the composite voice signals. The linear signal is then again compressed to provide a CVSD digital sequence for transmission to the conferees.

With the present invention there is all digital processing and therefore the system is completely compatible with new digital telephone systems. No conversions are performed on the CVSD signals and thus there is no degradation of the signal-to-noise ratio imposed by the conference arrangement. Further, the absence of conversions means the cost of conversion hardware or software is eliminated. Finally, there are no inherent limitations on the number of conferees that can be handled.

It is therefore an object of the present invention to provide improved circuitry for combining nonlinear digital representations of an analog signal in an economical manner to produce a linear digital signal representative of the composite of the analog signals being represented.

A further object of the present invention is to provide an improved and less expensive approach to conferencing nonlinear digital signals for use in telephone transmission systems.

Other objects and advantages of the present invention will be apparent from a reading of the specification and appended claims in conjunction with the drawings wherein:

FIG. 1 is a functional block diagram of a first embodiment of the invention;

FIGS. 2a and 2b provide a detailed schematic diagram of the expansion and summation portion of FIG. 1 as used in one embodiment of the invention;

FIGS. 3a, 3b and 3c provide a detailed schematic diagram of the digital integrator and detector portions of FIG. 1;

FIG. 4 is a set of waveforms for use in explaining the operation of FIGS. 2 and 3; and FIG. 5 is a functional block diagram of an embodiment of the invention using time multiplexed techniques to reduce the amount of hardware from that necessary to implement FIG. 1, and to provide simultaneous multiple conference capability.

DETAILED DESCRIPTION

Figure 1:
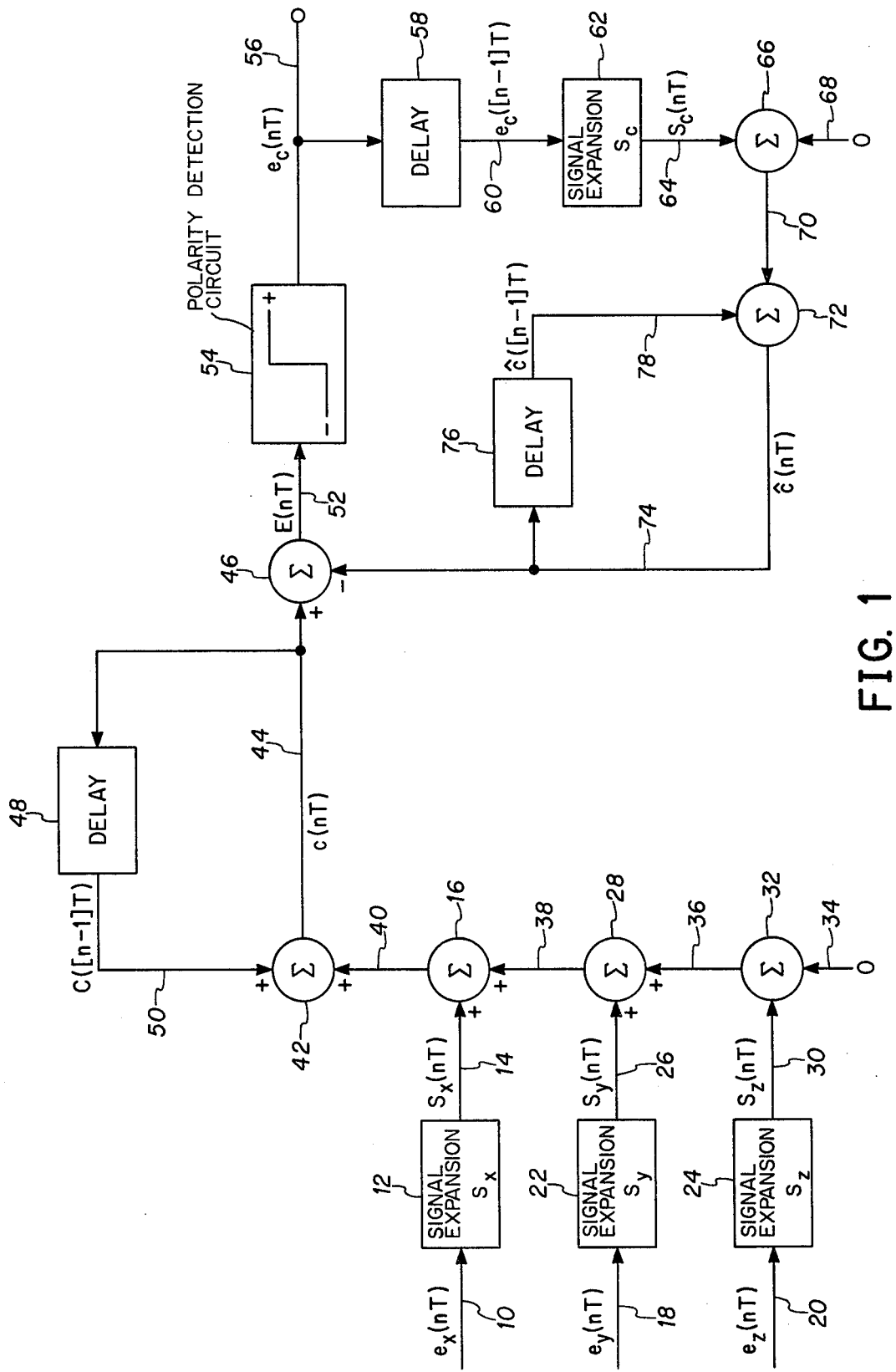

In FIG. 1, a first input line 10 labeled $e_x(nT)$ is applied to a signal expansion or expanding block 12. Block 12 is labeled $S_x$. The use of a small e throughout this figure signifies a nonlinear digital signal. The nT refers to the present time increment representation of that signal with (n-1)T representing an immediately previous increment of the signal. A linear digital output of block 12 is labeled 14 and is given the additional designation of $S_x(nT)$. The lead 14 is applied to a summation device 16. Further inputs are illustrated as 18 and 20 for comparable y and z inputs and are applied to blocks 22 and 24. The output of block 22 is applied on a lead 26 to a summation device 28 while an output of block 24 is applied on lead 30 to a summation device 32. Summation device 32 has an additional input 34 to which a digital input signal representative of the value zero is applied. It may be commented that the summation device 32 and the input 34 are not required for operation, but were illustrated to comply with the actual implementation which provided in a single unit a combination of an expansion unit and a summation device, and since such a combination is used extensively in the circuit, it was implemented in the manner shown in FIG. 1. An output 36 supplies an eight bit output to summation device 28. An eight bit output 38 of summation device 28 supplies an additional input to summation device 16. A further output 40 provides eight bits of summation signal from summation device 16 to a summation device 42. The output of summation device 42 is provided on a lead 44 as an input to a further summation device 46 as well as to a delay block 48. Delay block 48 provides a one time unit delayed signal (equivalent to the time duration between the start of consecutive data bits in the incoming bit stream) as a further input on lead 50 to summation device 42. As illustrated, this delayed bit is given the designation of C([n-1]T). An output of summation device 46 is provided on lead 52 as E(nT) to a polarity detection circuit 54 which provides either a positive or negative output depending upon the relative polarities of the inputs to summation device 46. The combination of summation device 46 and detection circuit 54 provide a comparison function or comparator action. An output of block 54 is provided on a lead 56 as an apparatus output and the signal on lead 56 is also applied to a signal delay block 58. The delay block 58 provides a one time unit delayed signal on a lead 60 to an expansion device 62 which provides an output on lead 64 to a summation device 66 which provides an output on lead 64 to a summation device 66 which has a digital signal representative of the value zero applied at an additional input via a lead 68. An output of summation device 66 is applied via a lead 70 to a summation device 72. An estimated signal is supplied from summation device 72 on a lead 74 as a second input to summation device 46 and also as an input to a signal delay block 76. The estimated signal is represented by the $\hat{c}(nT)$ with the hat ($\wedge$) representating an estimate. An output of delay block 76 is a one bit time delayed estimated signal and is applied via a lead 78 as a second input to summation device 72.

It may be commented at this time that the signals appearing on leads 10, 18 and 20 are nonlinear digital representations of an analog signal. More specifically, in the embodiment shown, they are nonlinear delta modulated representative signals of voice signals. After being expanded through the blocks 12, 22 and 24, the signals are linear differential PCM signal. As defined herein, PCM signals are pulse code modulated signals representative of the amplitude of the waveform in the time domain. After being summed in the summing units 16, 28 and 32, the output on 40 is a composite linear differential PCM signal indicative of the composite voice signals of the conferees involved in the conference. The device 42 in combination with block 48 constitutes a digital integrating circuit which is adding each differential to the total summation of the previous signals to provide at any given instant of time the present total amplitude of the composite voice signal. The signal is designated as a linear summed PCM signal and appears on lead 44. The summation device 46 in combination with block 54 operates on the basis of a detection function for detecting the relative amplitudes of the signals appearing on leads 44 and 74. The signal appearing on lead 74 is, of course, an estimated representation of the total linear summed PCM as obtained by the feedback loop. This estimated signal is obtained by taking the nonlinear delta signal as output by block 54, delaying it, expanding it in the same format as originally provided in the expansion blocks such as 12 to provide a linear differential PCM signal and time integrating this value in the digital integrating circuit represented by summation device 72 and delay block 76. If the estimated and actual signals do not compare, further delta outputs are provided by the detection circuit until the inputs are substantially identical.

Figure 2A:
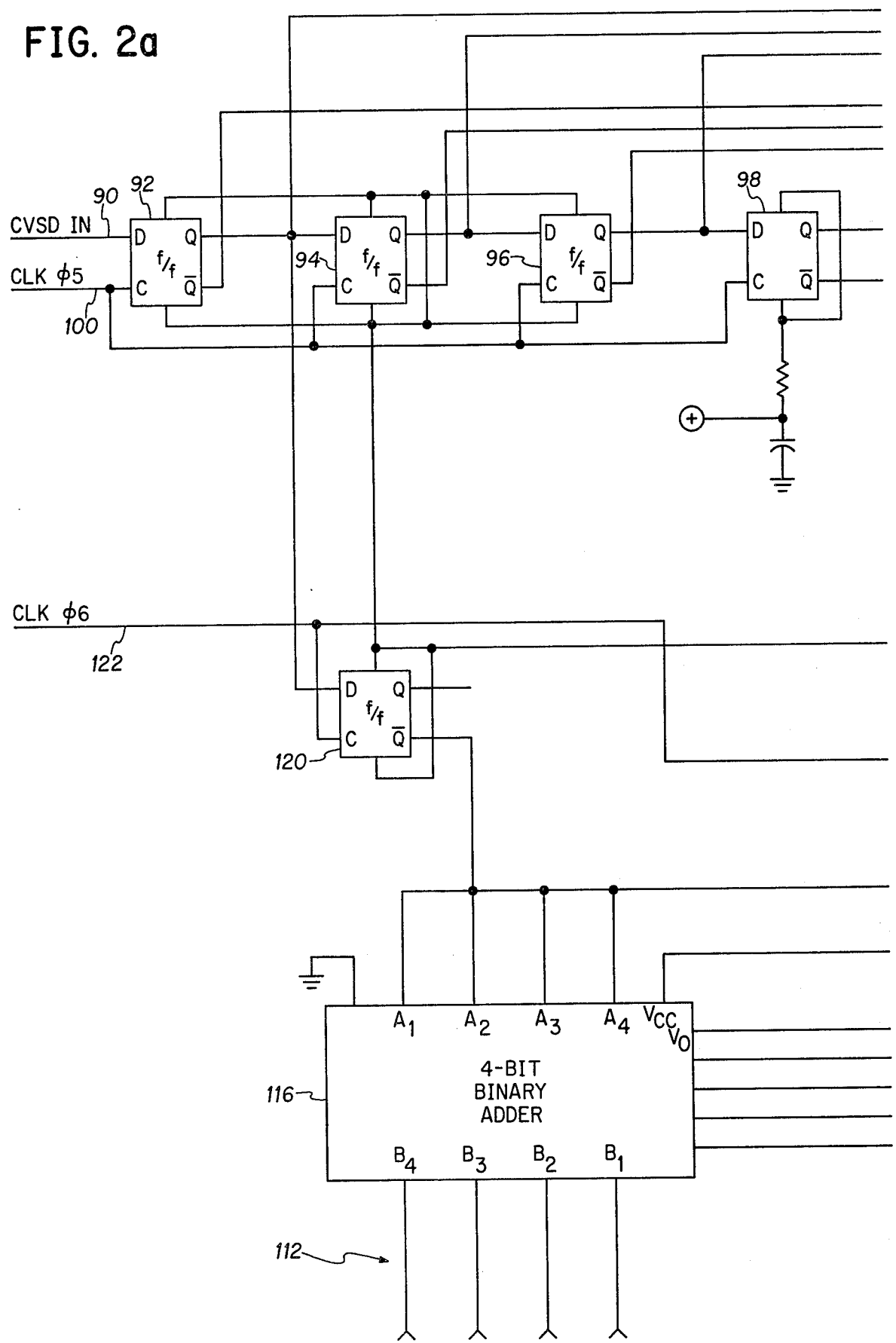
Figure 2B:
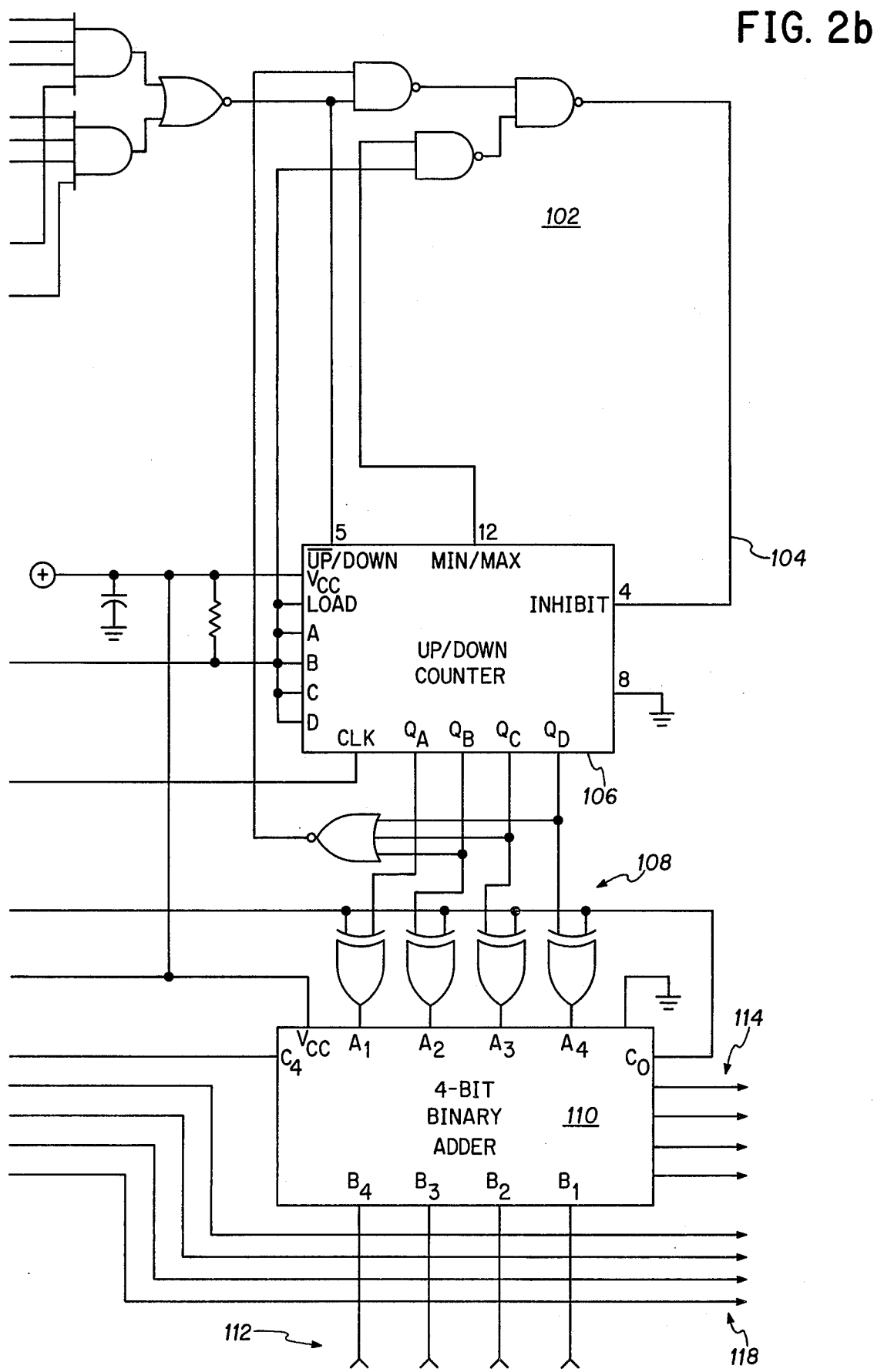

In FIGS. 2a and 2b a logic diagram is shown illustrating one of the many possible digital implementations of an expansion function which might be used with CVSD-Modulated Voice Signals. Nonlinear digital CVSD inputs are provided on lead 90 to a set of four D flip-flops 92, 94, 96 and 98. These flip-flops 92 through 98 also receive a clock signal of phase five ($\phi 5$) on a lead 100. The four flip-flops act much as a shift register and store both the present incoming bit as well as the three previous digital bits. These signals are supplied to a set of AND gates which search the input sequence for consecutive "ones" or "zeroes", and provide outputs to NOR gates and to a plurality of further gates designated as 102 for controlling the up/down counter designated as 106. The output of the plurality of logic gates 102 is provided on a lead 104 to the INHIBIT input of the up/down counter. Counter 106 is given a designation of 74191 and may be obtained from Texas Instruments (TI) and various other manufacturers under this common part name. The output of up/down counter 106 which provides a binary representation of the magnitude of the differential of the speech waveform is provided on a plurality of leads to a set of EXCLUSIVE-OR gates or logic circuitry, generally designated at 108, which provide outputs to a binary four bit adder 110. Under control of D-type flip-flop 120, the outputs of 108 represent the amplitude of the differential of the speech signal, positive values being represented in standard binary format and negative values in two's complement format. Adder 110 is given the manufacturer's designation of 74283 and may also be purchased from TI. Four bit adder 110 also receives four bits of inputs on a plurality of leads 112 and provides four bits of output signal on a set of leads 114.

D-type flip-flop 120 latches the current input digital bit signal on lead 122 (clock $\phi 6$) and holds it for the duration of the sampling interval. The $\overline{Q}$ output of 120 is applied to four inputs of a second binary adder 116, which is identical in construction with block 110, and to one input of each of the four EXCLUSIVE-OR gates identified collectively as 108. The $\overline{Q}$ output of 120 is also applied to a $C_0$ input of adder 110. A $C_4$ output of adder 110 is applied to a $C_0$ input of adder 116. The net result of this configuration is to provide an eight bit binary addition function (implemented in blocks 110 and 116), either input of which may represent positive or negative values. If an input CVSD bit has a value of logic "0", implying a negative differential, the $A_1$ to $A_4$ inputs to the adders 110 and 116 assume the form of a two's complement representation of the output value of counter 106. This value (either positive or negative) is then added to the value of the input applied to inputs 112 to produce the outputs designated as 114 and 118.

Figure 3A:
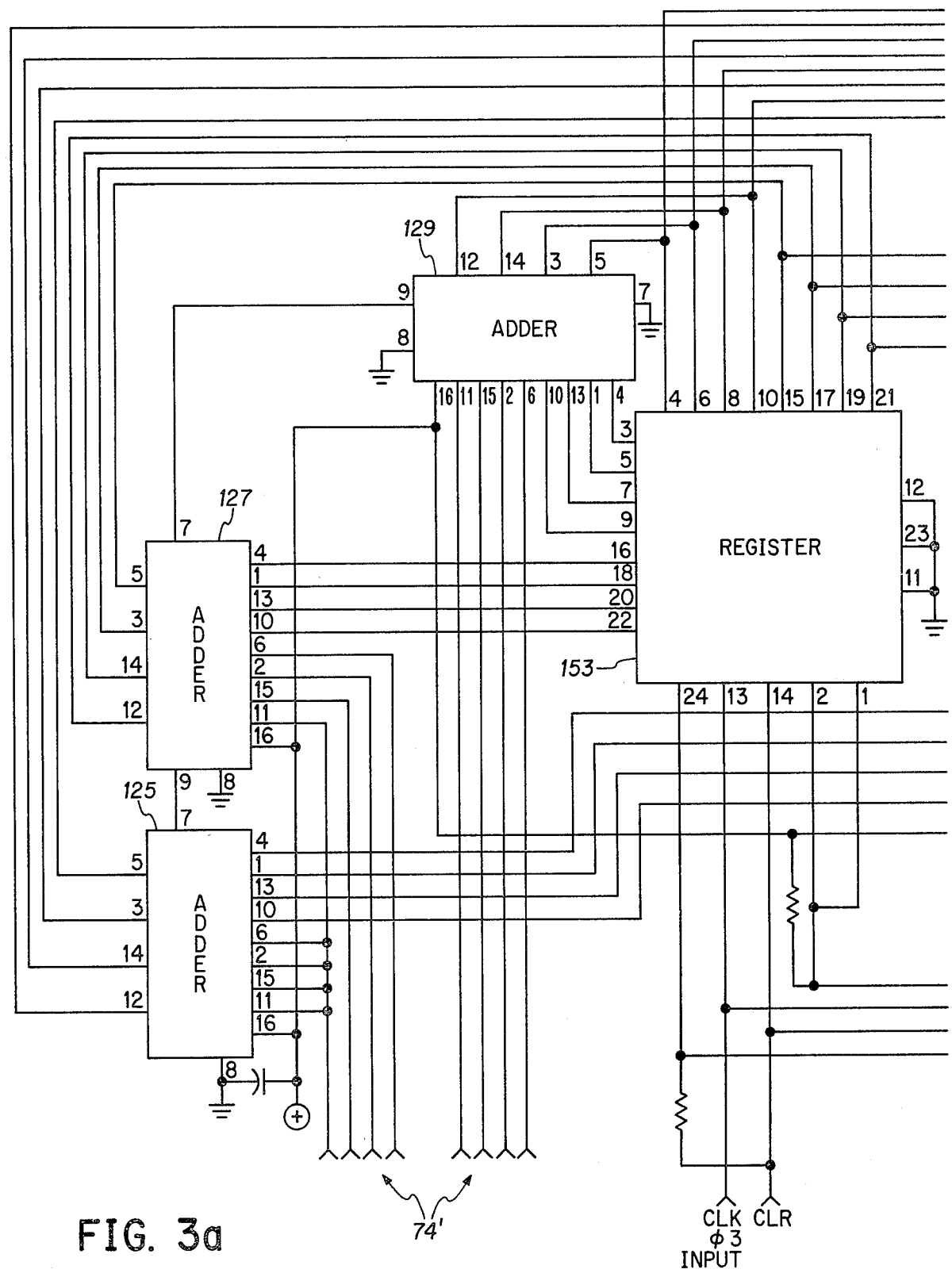
Figure 3B:
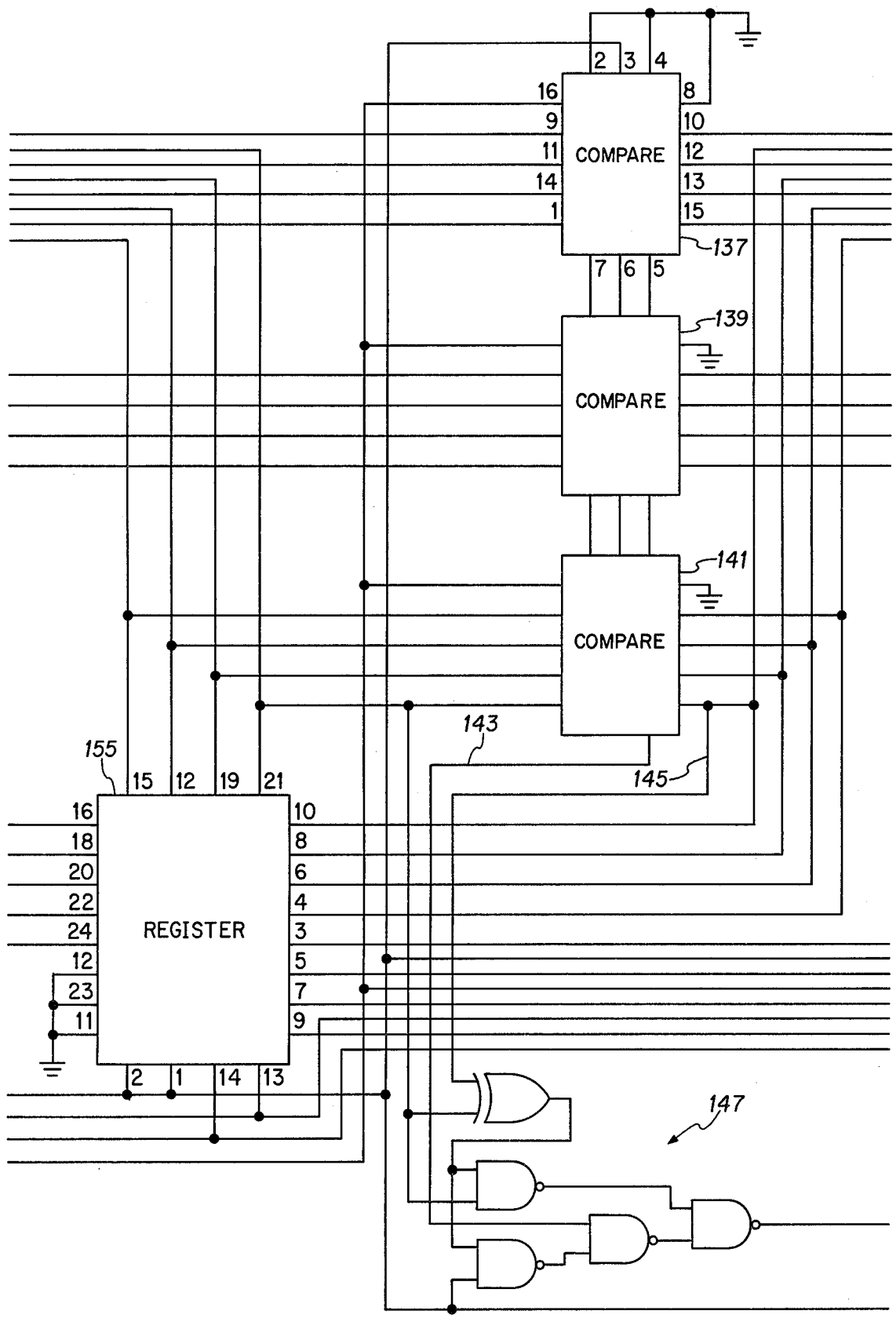
Figure 3C:
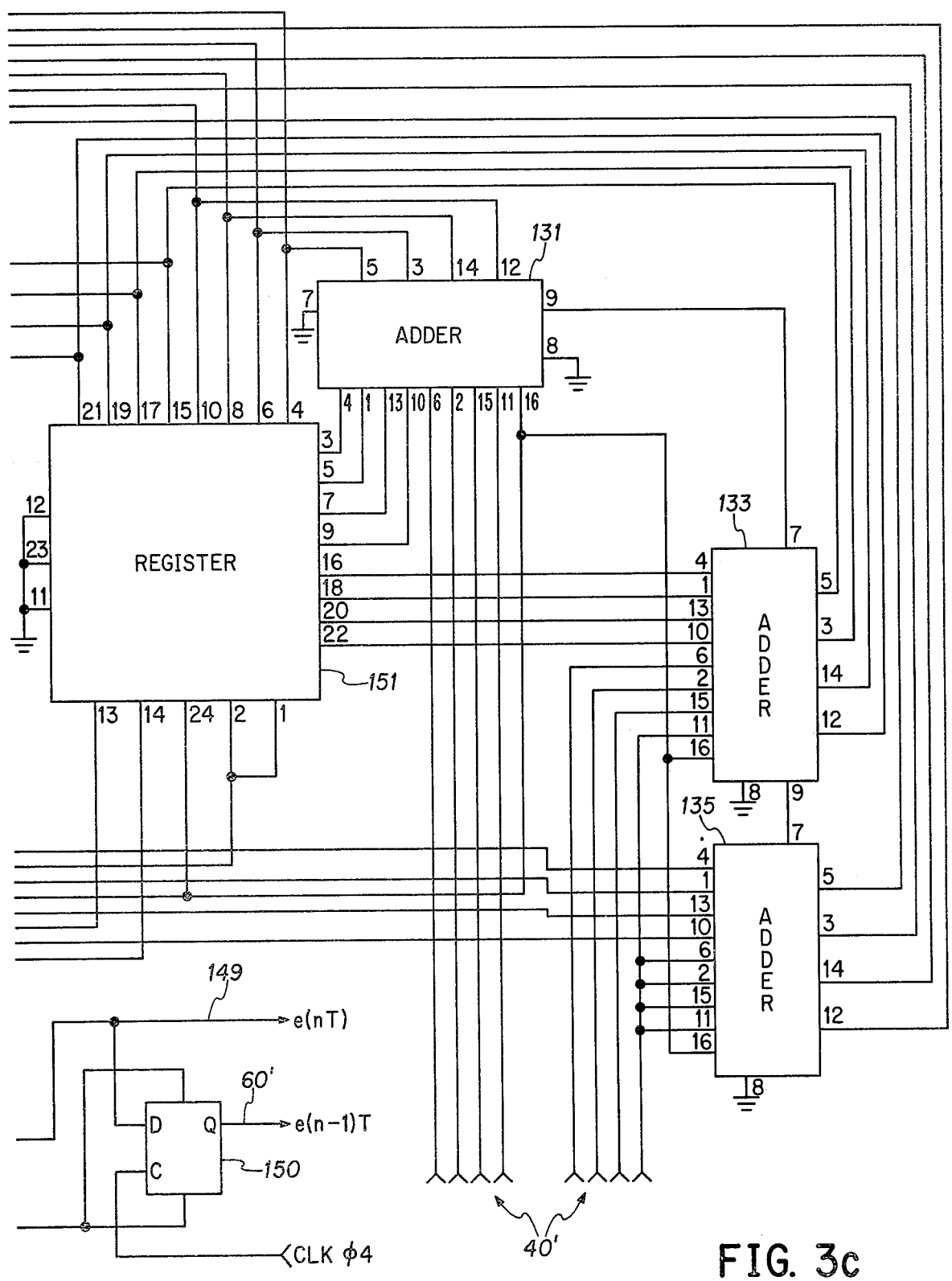

In FIGS. 3a, 3b and 3c, a plurality of four bit adder blocks 125, 127, 129, 131, 133 and 135 are shown. Each of these blocks is a 74283 as previously described. The blocks 125 through 129 receive the approximation input illustrated as lead 74 in FIG. 1 while the blocks 131, 133 and 135 receive the linear differential PCM input such as illustrated on lead 40 of FIG. 1. The blocks designated as 137, 139 and 141 are given the manufacturer's designation of 7485 and may be obtained from various manufacturers such as TI. In this embodiment of the invention, they are used for comparison purposes and provide outputs on leads 143 and 145 which are used in a polarity compensation circuit designated as 147 to provide an output on a lead 149 which would be substantially identical to that found on line 56 of FIG. 1. A D flip-flop 150 provides a delay and therein provides the signal appearing on lead 60 of FIG. 1. This is labeled in FIG. 3 as 60'. A plurality of registers 151, 153 and 155 each have manufacturer's designated numbers of 74199 and are used to provide the delay of blocks 48 and 76 in FIG. 1. The blocks 137, 139 and 141 are each connected identically and thus only the pin numbers of a single block are illustrated with the relative positions of the rest of the blocks being identical.

Figure 4:
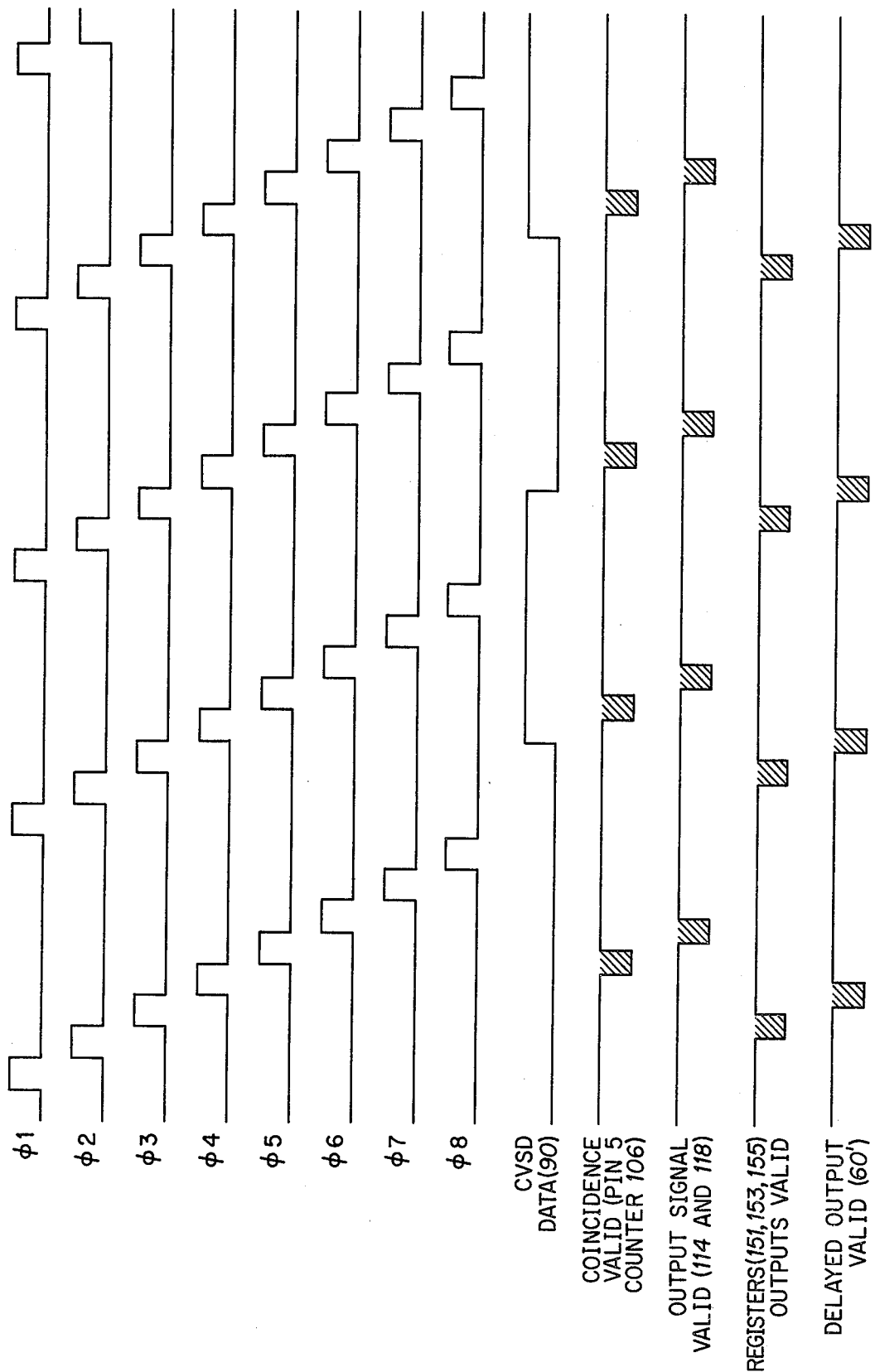

FIG. 4 illustrates waveforms of signals used in explaining the signal timing of FIGS. 2 and 3. The first eight signals are self-explanatory in that they are various phase clock signals. The next signal is the data signal as would appear on input lead 90. The COINCIDENCE VALID signal when in a logic 1 condition shows when the COINCIDENCE signal is valid. This signal is applied to pin 5 of counter 106. The next signal, when in a logic 1 condition, shows when the adder output signal (114 and 118) is valid. The penultimate waveform illustrates, in a logic 1 condition, when the register (151, 153 and 155) output signals are valid in FIG. 3 and the final signal illustrates when the delayed output signal on lead 60' is valid.

Figure 5:
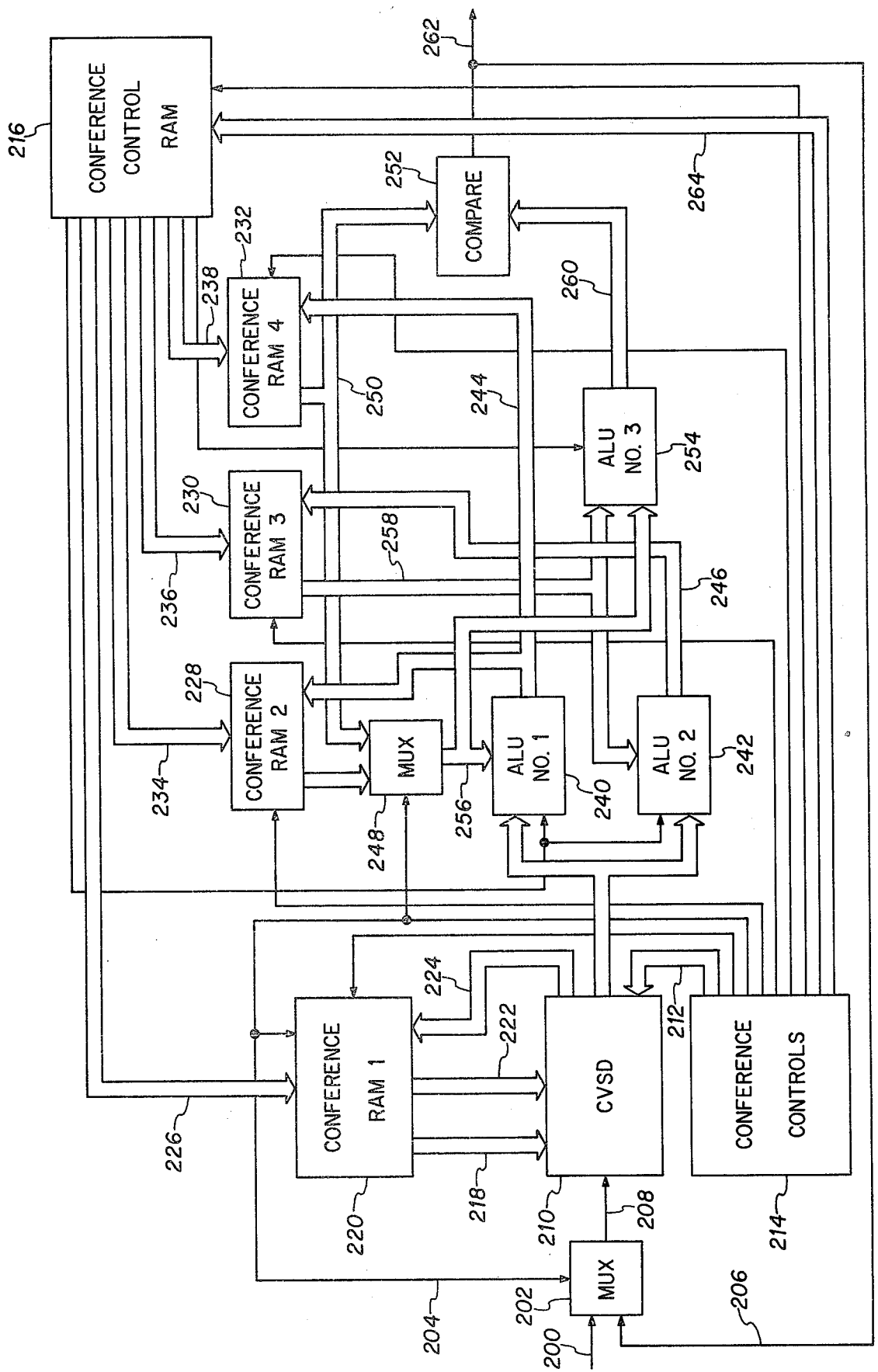

In FIG. 5, a data input lead is illustrated and designated 200. This is applied to a multiplex unit 202 having a control input 204 and a second input 206. An output of multiplex 202 is supplied on a lead 208 to a CVSD block 210 which provides an expansion of the signal from a nonlinear delta to a linear differential PCM signal much as described in connection with FIG. 1. Block 210 is controlled by a set of controls appearing on a set of leads 212 from a conference control block 214. Block 210 receives three digital bits on a set of leads 218 from a conference RAM #1 block 220. It receives an additional four bits on a set of leads 222 from RAM 220. RAM 220 receives seven bits of data comprising the difference magnitude and the last three input bits for a given conferee on a set of leads 224 from block 210. An address is provided on a set of leads 226 from conference control RAM 216 to block 220. Addresses are also provided from block 216 to the remaining conference RAMS 2, 3 and 4 designated as 228, 230 and 232 respectively on lead sets 234, 236 and 238 respectively. CVSD block 210 provides eight bits of output data to a pair of ALU's (arithmetic logic units) 1 and 2 further designated as 240 and 242 respectively. ALU 240 provides eight bits of output to conference RAMS 228 and 232 via a set of leads 244. ALU 242 provides eight bits of data to conference RAM 230 via a set of leads 246. Conference RAM 228 provides eight bits of data through a multiplex block 248 to the ALU's 240 and 254. Conference RAM 232 provides eight bits of data via a set of leads 250 to multiplex unit 248 as well as to a compare block 252. Multiplex unit 248 provides eight bits of data to an ALU 254 on a set of leads 256 as well as to the previously referenced ALU 240. RAM 230 provides eight bits of data on a set of leads 258 to both of the ALU's 242 and 254. ALU 254 provides eight bits of data on a set of leads 260 to the compare unit 252 which upon comparison with the data from leads 250 provides an output signal on a lead 262. Lead 262 is also used to provide feedback signals on lead 206 to the multiplex unit 202. Finally, the conference control block 214 provides individual signals to many of the various blocks as previously indicated as well as providing five bits of control information to RAM 216 on a set of leads 264.

OPERATION

In operation the incoming CVSD digital signals, as illustrated in FIG. 1 on leads 10, 18 and 20, are converted in the conversion units 12, 22 and 24 into linear differential signals indicative of the difference between the most recent sample and the previous sample. The incoming signals, as previously explained, are adaptive signals of either positive or negative polarity. If the analog signals are nonvarying, the incoming nonlinear signals continually change from plus to minus thereby indicating no change in the analog signal. When the analog signal represented by the CVSD signal on lead 10 starts changing in the positive direction, the lead 10 will exhibit a plurality of logic 1's. If the analog signal increases very fast, each sample will result in a positive logic level on lead 10. The algorithm used to provide the nonlinear conversion is an adaptive algorithm whereby if each of a given number of samples, in this case three, are taken, the delta amplitude represented by a given positive sign changes in value or amount. This algorithm thus prevents the use of a standard adjustment value or ratio in linearizing the incoming signal since the previous three logic values must be examined in determining the relative values of the differential signals output from the conversion blocks such as 12. Since the differential signals (14, 26 and 30) are all linearly representative of the difference in sampled analog signals, each of these signals can be summed wherein the signal on lead 40 is representative of the linear differential PCM signal of the composite of the analog signals. In other words, the digital value on lead 40 is directly representative of the difference between the previously sampled composite analog signals and the presently sampled composite analog signals. By delaying the last received signal one sampling time and adding it to the new signal, an integrating action is obtained wherein the signal appearing on lead 44 is in actuality a linearly changing signal directly indicative of the amplitude of the composite of all analog signals being sampled.

As will be realized, the circuitry described thus far performs a vital function of changing a plurality of nonlinear digital signals into a linear digital signal indicative of the amplitude of the nonlinear delta or differential signals input. Such a function can be useful by itself wherein analog sampled values are transmitted over telephone lines and used by a digital apparatus such as a computer at the received end. However, for use in telephone conferencing systems, this signal needs to be reconverted to a nonlinear signal. This is accomplished by summing device 46 in connection with the polarity detector 54 and the associated feedback loop. The output from summing device 46 on lead 52 is indicative of the relative amplitudes of the linear PCM input signal and an estimated PCM input signal as supplied on lead 74. The block 54 is used to assure that a positive or negative output level is provided indicative in polarity of the relative amplitudes of the input signals supplied on leads 44 and 74. As shown, the output on lead 56 is delayed one sampling time period by block 58 and converted in the same manner as previously indicated in block 62. This output signal from block 62 is added to a digital zero to produce the same signal on lead 70 as appears on lead 64. This is also a linear signal. This linear signal is summed with the total amplitude accumulated on lead 78 in summing device 72 to provide the estimated signal. As will be realized, this is a bootstrap feedback network and uses a popular technique or algorithm wherein it is assumed that a feedback signal is a given value and, if it is not that value, the output from the system is increased until the signal fed back reaches the given value.

It is believed that the explanation previously given relative to FIGS. 2, 3 and 4 in the Detailed Description are very adequate to provide one skilled in the art with the method of practicing the present invention. However, a very brief summation will be provided.

In FIG. 2, the incoming signal is placed in D flip-flop 92. The previous three received signals are stored in flip-flops 94, 96 and 98. This information from all four D flip-flops is used in the logic circuitry to provide the adaptive information used in the up/down counter to adjust it by different increments depending on how many previously received bits are of the same given value. The counter does not cycle. In other words, when it reaches a maximum it stays at a maximum until the input signal indicates that the analog equivalent is changing slope. In any event, the output from counter 106 is supplied to the adding blocks 110 and 116 to provide an eight bit output. As previously indicated, the circuitry of FIG. 2 was used in a plurality of instances in the original embodiment and thus FIG. 1 illustrates a summation or adding device 32 at a place where it is not needed and thus at 32 has an input 34 of value zero. In the other positions, such as 28 and 16, it receives the input from the previous stages. These inputs are shown in FIG. 2 on the bottom as leads 112.

The same circuitry as shown in FIG. 2 is used to provide the functions of 62 and 66 in the latter portion of FIG. 1 for the feedback network.

In FIG. 3, the summation of device 42 of FIG. 1 is accomplished in the adders on the right. The adders on the left provide the summation of device 46 in FIG. 1. The comparison function of device 54 is then accomplished in the comparators 137 through 141. Finally, the logic of gates 147 determines the polarity of the output in the event that the inputs to summing device 46 are of opposite polarity.

While the apparatus of FIG. 1 is completely functional and has been reduced to practice with satisfactory results, a switching system using time multiplexing for the conversion of the blocks such as 12 is more economically acceptable. As illustrated in FIG. 5, an input signal appearing on lead 200 is passed through a two-to-one multiplexer 202 and expanded in block 210. The information for the present difference magnitude as well as the last three input bits for a given line are stored in conference RAM 220 for use upon receipt of that conferee's signal in the next cycle. The difference amplitude signal alone is passed to ALU's 240 and 242. After being added to the previous total value in ALU 240 for that conference circuit as obtained from RAM 228 it is returned to RAM 228. The signal returned to RAM 228 is also applied to block 232 for use in obtaining the estimated signal appearing on lead 74 of FIG. 1. In ALU 242 the signal from block 210 is added to the signal previously stored for that conferee in RAM 230 so that a running value of the linear digital signal magnitude is stored in block 230 for each individual conferee of the total conference. As an example, RAM 230 has room for 32 words. Since each conference by definition requires at least three participants, the RAM 228 requires having at least a ten word capacity. A popular size is 16 words and this was used for one embodiment of the invention. The conference register 232, however, requires the same number of positions as 230 since the estimate register is used in providing an estimate for each of the signals returned to the conferee less that conferee's contribution to the conference signal.

Thus, the signal as appearing on lead 244 is now stored in conference RAM 228. The individual conferee's signal from RAM 230 is then subtracted from the total conference signal of the conference RAM 228 in ALU 254 and supplied to compare block 252 wherein it is compared with a signal from the estimate register 232 with the previous signal sent to that conferee. Thus, the signal on lead 262 would be essentially that of 56 going to an individual conferee if FIG. 1 included the capability of subtracting each conferee's signal from the total conference call as utilized by some systems.

This output signal is fed back on lead 206 to the second input of multiplex 202 where it is passed through the expansion algorithm of CVSD block 210 functioning in the same manner as block 62 of FIG. 1. The signal is applied to conference RAM 220 where it is stored for the next input from that conferee.

It may thus be determined that the present invention pertains to the addition of a plurality of nonlinear signals whether they are delta, differential or some other type of nonlinear signals to a linear digital signal directly representative of the analog signal being sampled and then providing the additional capability of returning the total linear digital signal to a nonlinear signal which is representative either of the total composite analog input or to the composite analog input less the particular conferee's input as is used in the algorithm for telephone systems.

While only a basic function diagram along with its detailed schematic and a multiplexed system is illustrated, I wish to emphasize that the approach will work in many applications and I wish to be limited only by the scope of the appended claims.

I claim:

1. Apparatus for combining a plurality of nonlinear delta modulated digital signals into a single nonlinear signal comprising, in combination:
   a first plurality of means for supplying nonlinear delta modulated signals to be combined;
   a second plurality of means, each connected to a given one of said first plurality, for converting nonlinear delta modulated signals to linear differential PCM signals at output means thereof;
   summing means, connected to said output means of said second means, for providing at an output thereof a composite linear differential PCM signal;
   digital integrating means, connected to said output means of said summing means, for providing at an output thereof a linear summed PCM signal;
   relative amplitude detection means, including a first input connected to said output of said digital integrating means, a second input for receiving estimated signals and an output for providing the single signal as a composite nonlinear delta signal; and
   feedback means, connected between said output and said second input of said detection means for nonlinear delta to linear differential PCM converting signals before integrating the results to obtain estimated signals.

2. Apparatus for combining a plurality of nonlinear digital signals into a single nonlinear signal comprising, in combination:
   a first plurality of means for supplying nonlinear modulated signals to be combined;
   a second plurality of means, each separately connected to a given one of said first plurality, for converting nonlinear digital signals to linear differential signals at output means thereof;
   summing means, connected to said output means of said second means, for providing at an output thereof a composite linear differential signal of inputs supplied to said summing means;
   digital integrating means, connected to said output means of said summing means, for providing at an output thereof a linear summed signal;
   detection means, including a first input connected to said output of said digital integrating means, a second input for receiving estimated signals and an output for providing the single nonlinear signal; and
   feedback means, connected between said output and said second input of said detection means for nonlinear digital signal to linear differential converting signals and then for integrating the results of the conversion to obtain estimated signals for application to said second input of said detection means.

3. Apparatus for digitally summing a plurality of nonlinear signals comprising, in combination:
   first means for providing a plurality of digital signals each representative of a nonlinear differential sequence of an analog signal;
   second means, connected to said first means, for converting each of said plurality of digital signals from a nonlinear representation of an analog signal to a linear differential of the respective analog signal;
   third means, connected to said second means, for providing a composite linear differential signal indicative of said plurality of signals; and
   accumulating means, connected to said third means, for providing, as a linear signal, a cumulative sum of the received composite signals.

4. Apparatus as claimed in claim 3 comprising, in addition:
   fourth means, connected to said accumulating means, for converting the linear signal to an output signal representative of a nonlinear differential sequence of the sum of the plurality of analog signals.

5. Apparatus as claimed in claim 4 wherein said fourth means comprises, in combination:
   relative amplitude detection means, connected to receive the linear signal and an estimated signal, for providing the output signal of said fourth means;
   first feedback means for converting the output signal in the same manner as described for signals received by said second means and thereby providing a linear further signal; and
   second feedback means, connected between said first feedback means and said detection means, for integrating the linear further signal from said first feedback means to provide the estimated signal to said detection means.

6. Apparatus for combining a plurality of nonlinear delta modulated digital signals into a single nonlinear signal comprising, in combination:
   a first plurality of means for supplying nonlinear delta modulated signals to be combined;
   a second plurality of means, each connected to a given one of said first plurality, for converting nonlinear delta modulated signals to linear differential PCM signals at output means thereof;

summing means, connected to said output means of said second means, for providing at an output thereof a composite linear differential PCM signal; and digital integrating means, connected to said output means of said summing means, for providing at an output thereof a linear summed PCM signal.

* * * * *